United States Patent
Redlingshoefer et al.

(10) Patent No.: US 7,736,618 B2
(45) Date of Patent: Jun. 15, 2010

(54) PRODUCTION OF HYDROGEN SULPHIDE IN A REACTION VESSEL

(75) Inventors: Hubert Redlingshoefer, Muenchsteinach (DE); Karl-Guenther Schuetze, Maintal (DE); Christoph Weckbecker, Gruendau-Lieblos (DE); Klaus Huthmacher, Gelnhausen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/280,265

(22) PCT Filed: Apr. 2, 2007

(86) PCT No.: PCT/EP2007/053157

§ 371 (c)(1),
(2), (4) Date: Aug. 21, 2008

(87) PCT Pub. No.: WO2007/124996

PCT Pub. Date: Nov. 8, 2007

(65) Prior Publication Data

US 2009/0053130 A1 Feb. 26, 2009

(30) Foreign Application Priority Data

Apr. 27, 2006 (DE) .................. 10 2006 019 590

(51) Int. Cl.
*C01B 17/16* (2006.01)
(52) U.S. Cl. ................... 423/564; 423/563
(58) Field of Classification Search ............. 423/563, 423/564; 420/441–460
See application file for complete search history.

(56) References Cited

U.S. PATENT DOCUMENTS

| 2,965,455 | A | | 12/1960 | Maude et al. |
| 3,560,006 | A | * | 2/1971 | Watanabe .................. 277/442 |
| 3,961,035 | A | * | 6/1976 | Mickley .................... 423/563 |
| 4,629,617 | A | * | 12/1986 | Voigt et al. ................. 423/563 |
| 6,623,869 | B1 | * | 9/2003 | Nishiyama et al. .......... 428/685 |

FOREIGN PATENT DOCUMENTS

| DE | 558 432 | 9/1932 |
| EP | 0 022 349 | 1/1981 |
| EP | 0 851 037 | 9/2002 |
| GB | 1 147 574 | 4/1969 |
| GE | 366 762 | 2/1932 |

OTHER PUBLICATIONS

Rosado et al, Protective behaviour of newly developed coatings against metal dusting, 2003, Materials and Corrosion, 54 No. 11, pp. 831-853.*
Rossado C et al. "Protective Behavior of Newly Developed Coatings Against Metal Dusting", Materials and Corrosion, vol. 54, No. 11, XP002441147, pp. 831-853, (2003).

* cited by examiner

*Primary Examiner*—Edward M Johnson
(74) *Attorney, Agent, or Firm*—Oblon, Spivak, McClelland, Maier & Neustadt, L.L.P.

(57) ABSTRACT

The invention relates to a reaction vessel in which hydrogen sulphide is produced from sulphur and hydrogen, wherein the reaction vessel is partially or completely made up of a material which is resistant to the reaction mixture and its compounds and/or elements and which remains resistant even at high temperatures.

27 Claims, No Drawings

PRODUCTION OF HYDROGEN SULPHIDE IN A REACTION VESSEL

The present invention relates to a reaction vessel in which hydrogen sulphide is prepared from sulphur and hydrogen, the reaction vessel consisting partly or fully of a material which is resistant towards these compounds and elements and retains its stability even at high temperatures.

Hydrogen sulphide in particular is an industrially important intermediate, for example for the synthesis of methyl mercaptan, dimethyl sulphide, dimethyl disulphide, sulphonic acids, dimethyl sulphoxide, dimethyl sulphone, and for numerous sulphidation reactions. It is obtained nowadays predominantly from crude oil and natural gas processing, and by reaction of sulphur and hydrogen.

The synthesis of hydrogen sulphide from the elements hydrogen and sulphur is effected typically by introducing hydrogen into liquid sulphur and to a downstream reaction chamber in the gas phase. Both catalysed and uncatalysed processes are known. Hydrogen sulphide is synthesized commonly in the gas phase at temperatures between 300 and 600° C. and at pressures between 1 and 30 bar. The industrial production of hydrogen sulphide from the elements proceeds, according to Ullmann's Encyclopaedia of Industrial Chemistry, Wiley-VCH, 2002, at temperatures of 450° C. and a pressure of 7 bar.

GB 1193040 describes the uncatalysed synthesis of hydrogen sulphide at relatively high temperatures of 400 to 600° C. and pressures of 4 to 15 bar. It is stated that the required temperature is determined by the pressure at which the synthesis is to proceed. At a pressure of 9 bar, 500° C. are accordingly required.

An essential point in the preparation of hydrogen sulphide from sulphur and hydrogen is in particular the temperature control. High temperatures are needed to achieve a state of equilibrium at which a molar hydrogen:sulphur ratio in the gas phase of about 1:1 is established. Only this enables the synthesis of pure hydrogen sulphide. With increasing pressure, the temperature has to be increased greatly in accordance with the vapour pressure curve of sulphur, in order to achieve the desired molar ratio of 1:1 in the gas phase. In this context, even small differences in the pressure of, for example, 1 bar or less are of great significance.

CSSR 190792 describes a process variant for the preparation of hydrogen sulphide, high reaction temperatures being avoided by a comparatively complex series connection of several reactors. High temperatures are avoided there specifically owing to corrosion problems. CSSR 190793 reports severe corrosion to the plant from temperatures of 400° C.

U.S. Pat. No. 4,094,961 also reports severe corrosion at temperatures of 440 to 540° C. in the synthesis of hydrogen sulphide. The synthesis is therefore performed there only at temperatures below 440° C.

The article B. Glaser, M. Schütze, F. Vollhardt, "Auswertung von Daten zum H$_2$S-Angriff auf Stähle bei verschiedenen Temperaturen und Konzentrationen" [Evaluation of Data on H$_2$S Attack on Steels at Different Temperatures and Concentrations], Werkstoffe und Korrosion 42, 374-376, 1991 states that, for plants in which there is corrosive attack by H$_2$S at elevated temperatures, this attack is a significant reason for the hindrance of a further development of such plants. In particular, the transition to higher temperatures and hence to an economic improvement in the corresponding processes remains blocked to date, since massive corrosion damage and hence failure of the plants occur in this case even after short times. The main influencing factors on the corrosion which are mentioned are the temperature and the H$_2$S concentration. A significantly restricted countermeasure mentioned is the increase in the Cr content in the steel to 16%, an increase over and above 16% having only a less marked effect. Thus, attrition rates of the steels of more than 0.5 or even more than 1.0 mm/a at H$_2$S concentrations of 10% by volume at 450-550° C. are reported. Although very highly alloyed steels exhibit somewhat better performance overall, it becomes clear that the suitability of the steel material for this use is restricted.

EP-B-0851037 discloses Cr—Ni alloys which possess increased corrosion resistance against hydrogen sulphide and are used for producing pipelines for the transport of mineral oil and natural gas.

It is an object of the invention to provide a reaction vessel for use in the synthesis of hydrogen sulphide which can be operated reliably even at high reaction temperatures over a prolonged period without high attrition of the material.

The invention provides a reaction vessel which consists partly or fully of a material which has low attrition rates even at high temperatures.

While the steels and stainless steels used most frequently in the chemicals industry (for example 1.4571) comprise predominantly the main constituents Fe, Cr and Ni and additions of Mo, Ti, P, S, Mn, Si and C in widely differing composition, there are also numerous specialty materials with different further elements and compounds. Since, in spite of the variety, a particularly suitable material has not been found, the above-described corrosion problems occurred at high reaction temperatures in the synthesis of hydrogen sulphide at high temperatures, which restricted the further development of the overall process.

Materials have now been found which are resistant under the conditions of the synthesis of hydrogen sulphide at high temperatures. In addition to the constituents of the most frequently used materials, they preferably comprise additions such as Co, Al, Cu and/or Y. Some of these may be present only in relatively small amounts of a few percent and less, and already provide a distinct improvement in the corrosion performance. Both the design of a stable and reliable reaction vessel and the further development of the process at high reaction temperatures are ensured with these materials.

According to the invention, a material for the synthesis of hydrogen sulphide at high temperatures with a content of Al of preferably at least 1%, more preferably 1 to 10%, in particular 1 to 5%, and optionally a content of Cu, Co and/or Y of preferably 0 to 5%, more preferably 0 to 2%, is used, the percentages being stated in % by weight. Moreover, elements including Fe, Cr, Ni, and additions of Mo, Ti, P, S, Mn, Si, C and further elements may be present in widely varying composition. It has been found that the increase in the content of Cr also increases the stability, but the influence of the Co, Al, Cu and/or Y additions is greater.

Preference is given to using NiCr alloys, especially a material which contains the constituents 0-0.3% C, 0-2.5% Si, 0-2.5% Mn, 0-0.1% P, 0-0.3% S, 15.0-28.0% Cr, 0-1.0% Cu, 0-radical % Fe, 1.0-5.0% Al, 0-2.5% Co, 0-1.5% Ti, 0-0.4% Y and 20 to 70% Ni.

Particular preference is given to a material which contains the constituents 0.1-0.25% C, 0-0.5% Si, 0-0.5% Mn, 0-0.05% P, 0-0.02% S, 19.0-27.0% Cr, 0-0.2% Cu, 2.0-remainder % Fe, 1.5-4.0% Al, 0-0.3% Co, 0.1-0.3% Ti, 0.05-0.15% Y and 30 to 70% Ni.

The percentages are always calculated relative to 100%.

In the course of investigations, the following materials, for example, have been tested for their suitability, and are designated according to DIN and the corresponding US Standard:

| DIN No. | US Standard No. |
| --- | --- |
| 1.4571 | AISI 316Ti |
| 1.4841 | AISI 314 |
| 2.4851 | UNS N06601 (alloy 601) |
| 2.4633 | UNS N06025 |
| 3.3535 | AA 5754 |

Preference is given to using, for example, the materials 2.4633, 2.4851 or 3.3535.

The presence of aluminium in the material is essential.

The invention likewise provides for the use of the inventive reaction vessel in the preparation of hydrogen sulphide from hydrogen and sulphur, especially at high temperatures.

The temperatures in the synthesis of hydrogen sulphide are in the range from 300 to 600° C., in particular 400 to 550° C.

In the synthesis of hydrogen sulphide, in addition to the presence of the target product, the presence of sulphur, hydrogen, impurities or by-products is also of significance for the stability of the reaction vessel. It is even possible that, in the synthesis of hydrogen sulphide, solely the assistants, feedstocks, their impurities or by-products and the composition of the reaction mixture and the reaction conditions determine the material selection for the reaction vessel.

The stability is measured in the form of the attrition rate by optical or microscopic evaluation.

A low attrition rate in hydrogen sulphide synthesis at high temperatures is understood to mean uniform area 1 attrition of less than 0.5 mm/a, preferably less than 0.3 mm/a. Should the attrition be between 0.1 and 0.3 mm/a, this can typically be balanced out by a corrosion additive for long-term operation of the reaction vessel. Attritions of >0.5 mm/a would lead to massive blockages of apparatus and pipelines and to significantly increased material demands, high maintenance costs and greater safety risks.

It may be advantageous to manufacture the reaction vessel only partly from the very stable material when, for example, particular semifinished products are not available in the desired dimensions or, if they are, are very expensive. In that case, conventional materials such as normal or highly alloyed stainless steel with appropriate corrosion additive are used owing to the better availability or the significantly lower price for this limited part of the reaction vessel, while the remaining part of the reaction vessel consists of the stable material. Since the corrosion behaviour depends greatly upon the temperature and the temperature can be different within the reaction vessel, it is also possible for only the materials of the reaction vessel which are exposed to high temperatures during the reaction to consist of the stable material with the desired low attrition rates, while the remaining part is manufactured from other materials with higher attrition rates if appropriate. Connection lines, fittings or measurement and control units may also comprise the inventive material.

In some cases, it is appropriate to pretreat the reaction vessel or the material parts used chemically or thermally before the first use, for example by pickling or by pre-oxidation at high temperatures. This may increase the stability of the reaction vessel. Processes known to those skilled in the art are used.

For the manufacturing and assembly of the reaction vessel, processes known to those skilled in the art, for example welding, are used. In this connection, it is likewise possible to use suitable additive materials for surface treatment or for bonding components, for example welding additive materials.

With regard to the shape, there are no particular restrictions for the reaction vessel. For example, parts of the reaction vessel made of tubes with an internal diameter of 30 to 130 mm, a wall thickness of 1 to 5 mm and a length of 1000 to 4000 mm may be used. Several examples of such tubes are used in a pressure vessel and exposed, for example, to temperatures between 350 and 600° C. and pressures of 0.2 to 30 bar. The reaction vessel or parts of the reaction vessel for the synthesis of hydrogen sulphide may be charged with catalyst. Another part of the reaction vessel may be charged predominantly with liquid sulphur and further parts predominantly with gases. The material used may additionally accelerate the conversion to hydrogen sulphide by virtue of its constituents.

The process for preparing hydrogen sulphide likewise forms part of the invention, the process proceeding in the inventive vessels.

The person skilled in the art is free to select the process steps to be combined for the preparation of hydrogen sulphide, and it is also possible to combine a plurality of reaction vessels and different apparatus for the removal of by-products or unconsumed feedstocks.

For example, for the preparation of hydrogen sulphide, hydrogen at a pressure of 8 to 20 bar is introduced into liquid sulphur in the reaction vessel and converted in a downstream reaction chamber of the reaction vessel. The entire arrangement is preferably operated at the same temperature.

Moreover, the conversion to hydrogen sulphide preferably proceeds in the presence of a heterogeneous catalyst. The catalyst is preferably a sulphur-resistant hydrogenation catalyst which preferably consists of a support, for example silicon oxide, aluminium oxide, zirconium oxide or titanium oxide, and one or more of the active elements molybdenum, nickel, tungsten, vanadium, cobalt, sulphur, selenium, phosphorus, arsenic, antimony and bismuth. The catalyst may be used either in the liquid phase or in the gas phase. Depending on the reaction conditions, especially at high temperatures, at least some of the hydrogen sulphide may be formed in the reaction vessel even without the action of a catalyst.

In a further embodiment of the invention, a plurality of, especially two or three, reaction vessels made of the inventive material are connected in series. In this case, the hydrogen converted only partly in the first reaction vessel, together with the hydrogen sulphide formed, is converted further to hydrogen sulphide in a further reaction vessel for further conversion to hydrogen sulphide, preferably distributed in liquid sulphur and directly in the region of the liquid sulphur and/or in a downstream gas space. In the case of use of two reaction vessels connected in series, the conversion of hydrogen downstream of the first reactor is generally between 40 and 85%. When three reactors are used, the conversion of hydrogen downstream of the first reactor is 20 to 50% and, downstream of the second reactor, generally 50 to 85%. When a plurality of reaction vessels (reactors) are to be used, preferably all or else only one may consist of the inventive material. When a plurality of reaction vessels are to be connected in series, it is also possible for their joining or connecting lines and fittings and measurement and control units to consist of the inventive material.

Instead of pure hydrogen, it is also possible to pass contaminated hydrogen through the liquid sulphur. The contaminants may, for example, be carbon dioxide, hydrogen sulphide, water, methanol, methane, ethane, propane, or other volatile hydrocarbons. Preference is given to using hydrogen with a purity of greater than 65% by volume, of which preferably more than 98% of the hydrogen used is converted to hydrogen sulphide. The contaminants in the hydrogen or their reaction products are preferably not removed before the synthesis of methyl mercaptan, but rather left in the reactant mixture. The selection of the inventive material of the reaction vessel is preferably not influenced by the purity of the hydrogen used. The same applies to the use of the sulphur used. This too may comprise various impurities.

Overall, the invention firstly allows more economically viable operation of production plants for hydrogen sulphide, since the reaction vessel, even in the course of long operation of several years or decades, only needs a low level of maintenance and repair, and need not be replaced partly or fully. Secondly, the selection of a stable material increases the plant reliability, because the risk of material failure, the probability of accidents as a result of discharge of dangerous substances is minimized. This is of particular significance in the case of very poisonous substances such as hydrogen sulphide.

In addition, the discovery of materials stable at high temperatures enables the further development of the overall process for preparing hydrogen sulphide, since limits which have previously been determined by the material stability disappear or are shifted to higher reaction temperatures.

In one embodiment of the reaction vessel for the preparation of hydrogen sulphide, a coating of predominantly aluminium or aluminium oxide is applied to its surface. The aluminium or aluminium oxide content of the coating is preferably more than 40%, more preferably more than 70%. In addition to aluminium, further elements may also be present. The method of applying this coating may be by various processes known to those skilled in the art, for example flame-spraying, chemical or physical gas deposition (CVD, PVD), melt dipping or electrolytic deposition. The thickness of this coating is subject to no particular restrictions, but to increase the stability, it should preferably be more than 100 µm, better more than 150 µm; it is commonly below 1 mm. With regard to the material to be coated, there are likewise no restrictions; for example, it is possible to coat customary steels or stainless steels such as 1.4571. It merely has to be ensured that the coating adheres in a stable manner. Preferable materials to be coated are those with approximately the same coefficients of thermal expansion, in order to prevent flaking of the layers in the course of cooling and heating.

In a further embodiment of the invention, the content of aluminium at the surface of a steel is enriched. This is not done by layer formation but rather by solid-state diffusion of the aluminium into the regions close to the surface at high temperatures. In the course of this, the aluminium powders used enter into a compound with the material. This has the advantage that no different coefficients of thermal expansion, as in the case of coating, can lead to flaking or to crack formation. The material which has then been enriched with aluminium at the surface then has, in the zones close to the surface (0 to 0.5 mm), an aluminium content of at least 1%, preferably more than 3%, more preferably more than 5%. With regard to the material to be enriched with aluminium at the surface, there are merely the restrictions that the aluminium can penetrate into the layers close to the surface by solid-state diffusion.

COMPARATIVE EXAMPLE 1

A material sample of the stainless steel with materials number 1.4571 and EN abbreviated material name X6CrNiMoTi17-12-2 of chemical composition <0.08% C, <1.0% Si, <2.0% Mn, <0.045% P, <0.015 S, 16.5-18.5% Cr, 2.0-2.5% Mo, <0.7% Ti, remainder Fe, and 10.5-13.5% Ni with an outer surface area of 15.94 cm$^2$ and a mass of 15.54 g was investigated in an autoclave which was filled with 200 ml of sulphur and pressurized to a pressure of 12 bar with one third hydrogen and two thirds hydrogen sulphide. The autoclave was operated at a temperature of 450° C. for 450 h under constant conditions. After the autoclave had been opened, the material sample was removed and analysed. By visual means alone, it could be seen that the material had in some places significantly flaked off at the surface. After the parts which adhered only loosely on the surface had been removed, the mass of the material sample was 14.78 g, which corresponds to a mass loss of 0.76 g and attrition of 476 g/m$^2$ or an attrition rate of 1.15 mm/a.

COMPARATIVE EXAMPLE 2

Analogously to Comparative Example 1, a further stainless steel of materials number 1.4841, the EN abbreviated material name X15CrNiSi25-20 and the chemical composition <0.2% C, 1.5-2.5% Si, <2.0% Mn, <0.045% P, <0.03 S, 24.0-26.0% Cr, remainder Fe and 19.0-22.0% Ni was investigated in an autoclave. By visual means alone, it could be seen that the material had in some places significantly flaked off at the surface. After removal of the parts adhering only loosely on the surface, the mass loss was to attrition of 296 g/m$^2$ or an attrition rate of 0.72 mm/a.

EXAMPLE 1

Analogously to Comparative Example 1, a further material, Alloy 601 with materials number 2.4851 and the EN abbreviated material name NiCr23Fe with a chemical composition of <0.1% C, <0.5% Si, <1.0% Mn, <0.02% P, <0.015 S, 21.0-25.0% Cr, <0.5% Cu, <18.0% Fe, 1.0-1.7% Al, <1.0% Co, <0.5% Ti, 0.05-0.12% Y, and 58.0-63.0% Ni was investigated in an autoclave. Visually, only a small flaked-off material fraction could be seen. After removal of the parts adhering only loosely on the surface, the mass loss corresponded to attrition of 158 g/m$^2$ or an attrition rate of 0.38 mm/a.

EXAMPLE 2

Analogously to Comparative Example 1, a further material, Alloy 602 CA with materials number 2.4633 and the EN abbreviated material name NiCr25FeAlY with a chemical composition of 0.15-0.25% C, <0.5% Si, <0.50% Mn, <0.02% P, <0.01 S, 24.0-26.0% Cr, <0.1% Cu, 8.0-11.0% Fe, 1.8-2.4% Al, <0.3% Co, 0.1-0.2% Ti, 0.05-0.12% Y, and 41.0-66.0% Ni was investigated in an autoclave. Visually, no flaked-off layers, cracks or holes could be seen. After removal of the parts adhering only loosely on the surface, the mass loss was to attrition of 82 g/m$^2$ or an attrition rate of 0.19 mm/a.

EXAMPLE 3

Analogously to Comparative Example 1, a further material with materials number 3.3535 and the EN abbreviated material name AW-Al Mg3 with a chemical composition of <0.4% Si, <0.50% Mn, <0.3% Cr, <0.1% Cu, <0m4% Fe, 96.0-97.5% Al, <0.15% Ti, <0.2% Zn, <0.3% Cr, and 2.6-3.6% Mg was investigated in an autoclave. Visually, no flaked-off layers, cracks or holes could be seen. The mass loss was to attrition of 0.8 g/m$^2$ or an attrition rate of 0.003 mm/a.

EXAMPLE 4

Analogously to Comparative Example 1, a further material 1.4571 with an about 100 µm-thick surface coating of $Al_2O_3$ was investigated in an autoclave. Visually, no flaked-off material fractions, cracks or holes could be seen. The mass loss was very low, which corresponds to a negligible attrition of 0.5 g/m² or to an attrition rate of 0.002 mm/a.

It can be stated that, in the case of the materials used in Examples 1-4, a significantly lower loss of mass or attrition occurs in the presence of sulphur, hydrogen and hydrogen sulphide. These aluminium-containing materials and their chemical composition are thus significantly better suited to the construction of a reaction vessel for the synthesis of hydrogen sulphide.

The invention claimed is:

1. A method for preparing hydrogen sulphide in a reaction vessel, comprising:
   reacting a mixture of sulphur and hydrogen in the reaction vessel to form a reaction mixture,
   wherein the reaction vessel and, optionally, connection lines and fittings and measurement and control units consist(s) partly or fully of a material which is resistant towards the reaction mixture and comprises aluminum, and
   wherein the reaction mixture consists of sulphur, hydrogen and hydrogen sulfide.

2. The method according to claim 1, wherein the material has a content of more than 1% by weight of aluminum.

3. The method according to claim 1, wherein the material has a content of 1 to 10% by weight of aluminum and a content of 0 to 5% by weight of at least one of Cu, Co and Y.

4. The method according to claim 1, wherein the material contains 0 to 0.3% C, 0 to 2.5% Si, 0 to 2.5% Mn, 0 to 0.1% P, 0 to 0.3% S, 15.0 to 28.0% Cr, 0 to 1.0% Cu, 0 to remainder % Fe, 1.0 to 5.0% Al, 0 to 2.5% Co, 0 to 1.5% Ti, 0 to 0.4% Y and up to 70% Ni (% in % by weight).

5. The method according to claim 1, wherein the material contains 0.1 to 0.25% C, 0 to 0.5% Si, 0 to 0.5% Mn, 0 to 0.05% P, 0 to 0.02% S, 19.0 to 27.0% Cr, 0 to 0.2% Cu, 2 remainder % Fe, 1.5 to 4.0% Al, 0 to 0.3% Co, 0.1 to 0.3% Ti, 0.05 to 0.15% Y and 30 to 70% Ni.

6. The method according to claim 1, wherein the material is coated with an aluminum oxide coating where the material is in contact with the reaction mixture.

7. The method according to claim 6, wherein the aluminum oxide coating is in the form of a layer having a thickness of 0.05 to 1.0 mm.

8. The method according to claim 6, wherein the material consists of a DIN No. 1.4571 material and is coated.

9. The method according to claim 1, wherein an outer zone close to the surface of the material is enriched with aluminum oxide or aluminum in comparison to an inner zone.

10. The method according to claim 9, wherein the outer zone is enriched by solid-state diffusion at high temperatures.

11. The method according to claim 9, wherein the thickness of the outer zone enriched with aluminum is 0.05 to 1.0 mm.

12. The method according to claim 9, wherein the vessel comprises a DIN No. 1.4571 material which is enriched with aluminum at a zone close to the surface.

13. The method according to claim 1, wherein the material is pretreated by pickling or pre-oxidation.

14. The method for preparing hydrogen sulphide according to claim 1, wherein the pressure in the reaction vessel during the reacting is >0 to 50 bar.

15. The method according to claim 14, wherein the pressure in the reactor for the hydrogen sulphide synthesis ranges from less than 9 to 20 bar.

16. The method according to claim 14, wherein the reacting is effected at a temperature between 300 and 600° C.

17. The method according to claim 14, wherein the reacting is effected in the presence of a heterogeneous catalyst.

18. The method according to claim 14, wherein the reacting is effected in the presence of a heterogeneous supported catalyst which comprises one or more of the active elements selected from the group consisting of molybdenum, nickel, tungsten, vanadium, cobalt, sulphur, selenium, phosphorus, arsenic, antimony, bismuth, silicon, aluminium, titanium and zirconium.

19. The method according to claim 14, wherein the hydrogen sulphide is prepared in two or more reaction vessels connected or joined in series.

20. The method according to claim 1, wherein the inner surface of the vessel is coated with a layer of aluminum oxide comprising aluminum metal in an amount of 5% by weight or more based on the total weight of the coating.

21. The method according to claim 1, wherein the reaction vessel is made of a material which comprises 0 to 0.1% C, 0 to 0.5% Si, 0 to 1.0% Mn, 0 to 0.2% P, 0 to 0.15% S, 0 to 25.5% Cr, 0 to 0.5% Cu, 0 to 18.0% Fe, 1.0 to 1.7% Al, 0 to 1.0% Co, 0 to 0.5% Ti, and 0.05 to 0.12% Y.

22. The method according to claim 1, wherein the reaction vessel is made of a material comprising 0.15 to 0.25% C, 0 to 0.5% Si, 0 to 0.50% Mn, 0 to 0.02% P, 0 to 0.10% S, 24.0 to 26.0% Cr, 0 to 0.1% Cu, 8.0 to 11.0% Fe, 1.8 to 2.4% Al, 0 to 0.3% Co, 0.1 to 0.2% Ti, 0.05 to 0.12% Y and 41.0 to 66.0% Ni.

23. The method according to claim 1, wherein the material is coated with a layer having a thickness of at least 100 μm.

24. The method according to claim 1, wherein the reaction vessel is made of a material comprising 0 to 0.4% Si, 0 to 0.50% Mn, 0 to 0.3% Cr, 0 to 0.1% Cu, 0 to 4% Fe, 96.0 to 97.5% Al, 0 to 0.15% Ti, 0 to 0.2% Gn, 0 to 0.3% Cr, and 2.6 to 3.6% Mg.

25. The method according to claim 1, comprising:
   a first vessel and a second vessel connected in series,
   wherein the first vessel contains a reaction mixture consisting of hydrogen, sulphur and hydrogen sulphide, and
   wherein the second vessel contains a reaction mixture consisting of hydrogen, sulphur and hydrogen sulphide, wherein the hydrogen sulphide is present in a greater amount relative to the hydrogen and sulphur than the relative amount of hydrogen sulphide present in the reaction mixture of the first vessel.

26. The method according to claim 1, wherein the reaction vessel is in the form of one or more tubes having an inner diameter of 30-130 mm and a length of from 1,000 to 4,000 mm.

27. A method for preparing hydrogen sulphide in a reaction vessel, comprising:
   reacting sulphur and hydrogen in the reaction vessel to form a reaction mixture consisting of hydrogen sulphide, sulphur and hydrogen;
   wherein the reaction vessel consists of a material which is resistant towards the reaction mixture and comprises an aluminum-containing material, or the reaction vessel has an inner surface in contact with the reaction mixture wherein the inner surface consists of the aluminum-containing material; and
   wherein the aluminum-containing material consists of 0 to 0.3% C, 0 to 2.5% Si, 0 to 2.5% Mn, 0 to 0.1% P, 0 to 0.3% S, 15.0 to 28.0% Cr, 0 to 1.0% Cu, 0 to remainder % Fe, 1.0 to 5.0% Al, 0 to 2.5% Co, 0 to 1.5% Ti, 0 to 0.4% Y and up to 70% Ni wherein % is % by weight based on the total weight of the aluminum-containing material.

* * * * *